United States Patent
Tatara et al.

(10) Patent No.: US 7,896,512 B2
(45) Date of Patent: Mar. 1, 2011

(54) VEHICLE HEADLAMP

(75) Inventors: Naohisa Tatara, Shizuoka (JP); Takashi Hori, Shizuoka (JP); Kiyotaka Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 95 days.

(21) Appl. No.: 12/208,809

(22) Filed: Sep. 11, 2008

(65) Prior Publication Data

US 2009/0086500 A1 Apr. 2, 2009

(30) Foreign Application Priority Data

Oct. 1, 2007 (JP) ................................ P. 2007-257474

(51) Int. Cl.
*B60Q 1/12* (2006.01)
(52) U.S. Cl. ...................... 362/43; 362/512; 362/539
(58) Field of Classification Search ............... 362/43–52, 362/464–468, 507–509, 512, 513, 538, 539
See application file for complete search history.

(56) References Cited

U.S. PATENT DOCUMENTS

| | | |
|---|---|---|
| 5,138,540 A | 8/1992 | Kobayashi et al. |
| 5,769,525 A | 6/1998 | Daumueller et al. |
| 6,623,147 B2 * | 9/2003 | Hayami et al. ............... 362/467 |
| 2005/0141234 A1 * | 6/2005 | Tajima et al. ................. 362/524 |
| 2007/0058387 A1 | 3/2007 | Takada |
| 2007/0177400 A1 * | 8/2007 | Tatsukawa .................... 362/514 |

FOREIGN PATENT DOCUMENTS

| | | |
|---|---|---|
| DE | 10 2004 020 493 A1 | 11/2005 |
| JP | 8-111101 A | 4/1996 |
| JP | 11-162206 A | 6/1999 |
| JP | 2002-289008 A | 10/2002 |
| JP | 2005-88856 A | 4/2005 |
| KR | 2003-0003971 A | 1/2003 |

OTHER PUBLICATIONS

Chinese Office Action dated Jan. 8, 2010 issued in Application No. 200810191133.6, 17 pages.
German Office Action issued in Application No. 10 2008 047 167.4-54, dated Aug. 7, 2009.
Korean Office Action, dated Oct. 15, 2010, in counterpart Application No. 10-2008-0094586.

* cited by examiner

*Primary Examiner* — Julie A Shallenberger
(74) *Attorney, Agent, or Firm* — Sughrue Mion, PLLC

(57) ABSTRACT

The vehicle headlamp is provided with a main lamp unit fixed and arranged inside a lamp chamber and sub-lamp units as an auxiliary lamp capable of changing and forming light distribution patterns by using semiconductor light emitting elements as light sources. The sub-lamp units are respectively equipped with a vertically changing mechanism for changing the illuminating direction in a vertical direction, a laterally changing mechanism for changing the illuminating direction in a lateral direction and a pattern changing mechanism for changing a light distribution pattern.

11 Claims, 9 Drawing Sheets

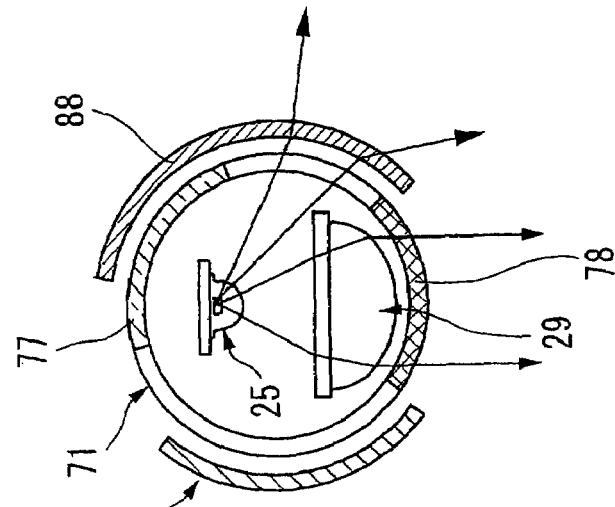
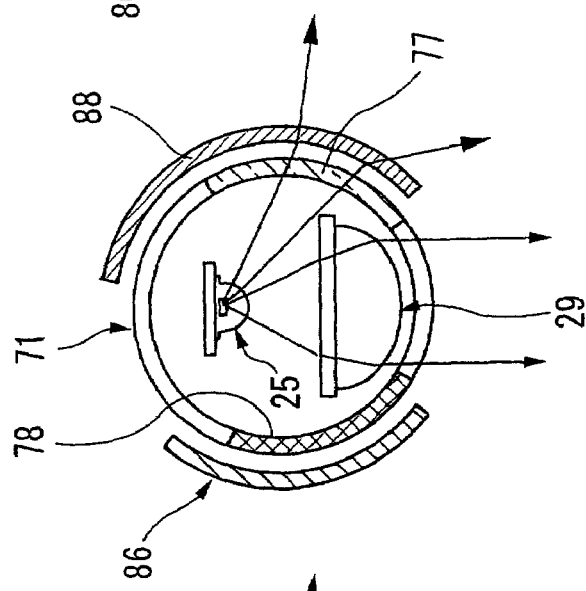
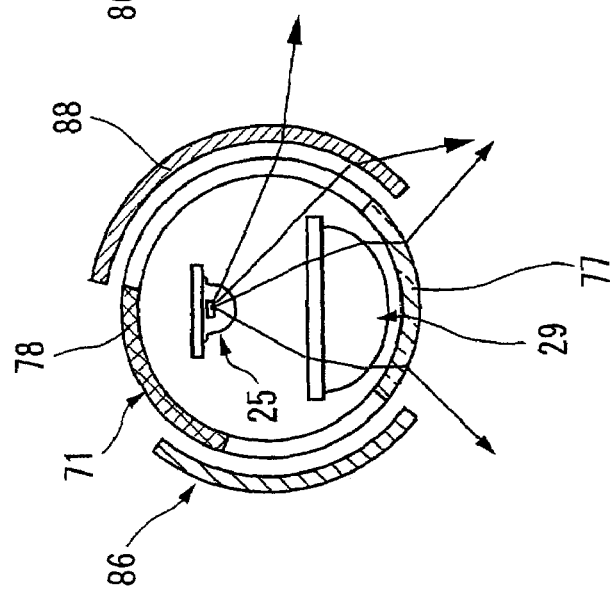

NO ONCOMING CAR

ONCOMING CAR IN FOR POSITION

ONCOMING CAR IN NEAR POSITION

RIGHT TURN

HIGH SPEED DRIVING

VEHICLE HEADLAMP

This application claims foreign priority from Japanese Patent Application No. 2007-257474 filed on Oct. 1, 2007, the entire contents of which are hereby incorporated by reference.

BACKGROUND OF THE INVENTION

1. Field of the Invention

The present invention relates to a vehicle headlamp capable of optimally controlling a light distribution of a lamp depending on a traveling environment of a vehicle, and more particularly to an improved technology capable of forming various types of light distribution patterns by a compact structure.

2. Background Art

It is desirable that a vehicle headlamp accurately realizes various light distribution patterns depending on driving conditions of a vehicle. Since beams emitted from a vehicle headlamp illuminate center parts ahead, there is a case where a sufficient illumination range cannot be secured ahead in a traveling direction when a vehicle is driven around a curve, turned left or right or changed in course etc. For example, there is a swivel-type vehicle headlamp in which a mechanism for laterally turning (rotationally moving) a lighting unit is assembled to a vehicle headlamp, thereby making it possible to secure a sufficient illumination range of beams at the time of traveling around the curve or the like and also obtain a preferable field of view.

The swivel-type vehicle headlamp is constituted in such a manner that the lighting unit is supported on a lamp-body supporting frame member so as to rotationally move in the lateral direction and the lighting unit is allowed to rotationally move and controlled by a control unit depending on traveling conditions of a vehicle. Thereby, beams illuminated from the lighting unit can be changed in the lateral direction, depending on the traveling conditions of the vehicle, a sufficient illumination range of beams can be secured ahead in a turning direction even at the time of traveling around a curve or the like, thus making it possible to obtain a preferable field of view.

However, there is a problem given below when a light-distribution changeable mechanism such as an adaptive front-lighting system (AFS) for optimally controlling (changing) light distribution patterns of a lamp depending on the traveling environment for the purpose of improving the visibility and safety is assembled into an optical projector-type lamp unit (PES).

More specifically, if a single optical projector-type lamp unit having a light quantity capable of forming all light distribution patterns is given a movable structure, there is posed such a problem that the unit is complicated in its structure and accordingly a driving mechanism and a driving source of the optical projector-type lamp unit are made greater in size for driving the unit which is quite heavy and synergistically increased in weight in association with the fact that constituents must be secured for strength.

There is also a problem that since a vehicle headlamp is made into an integrated product which is increased in size as a whole, the lamp is restricted in design, resulting in a difficulty in obtaining good design characteristics. There is another problem that where a light source having an electric discharge/light emission portion is used as a light source, heating from the light source is increased to restrict the selection of materials (low degree of freedom in design).

Further, there has been proposed a vehicle lamp fitting in which insufficient functions of a main lamp unit are imparted and complemented by a sub-lamp unit as a separate body (refer to JP-A-2005-088856). However, the sub-lamp unit is only for complementing color temperature of a light source for the main lamp unit and not for changing a light distribution pattern.

SUMMARY OF THE INVENTION

One or more embodiments of the invention provide a vehicle headlamp capable of imparting functions of forming various types of optimal light distribution patterns depending on traveling conditions of a vehicle without making the vehicle headlamp in its entirety greater in size and weight.

In accordance with one or more embodiments of the invention, a vehicle headlamp is provided with: a main lamp unit accommodated in a lamp chamber defined by a lamp body and a cover; and a sub-lamp unit accommodated in the lamp chamber. The sub-lamp unit is provided with: a light source comprising a semiconductor light emitting element; a vertically changing mechanism for changing a illuminating direction of the sub-lamp unit in a vertical direction; a laterally changing mechanism for changing the illuminating direction of the sub-lamp unit in a lateral direction; and a pattern changing mechanism for changing a light distribution pattern of the sub-lamp unit.

According to the above-constituted vehicle headlamp, the main lamp unit for securing a light quantity of main light distribution (in charge of main light quantity) is given a fixed structure, while only the sub-lamp unit functioning as an auxiliary lamp capable of changing and forming light distribution patterns is given a movable structure, by which unit driving sources (a motor, an actuator and others) of each changing mechanism are made compact, thus making it possible to impart functions of forming various types of preferable light distribution patterns depending on traveling conditions of a vehicle, without making the vehicle headlamp in its entirety greater in size and weight.

In the above-constituted vehicle headlamp, the sub-lamp unit may include: a projection lens arranged on an optical axis extending in a longitudinal direction of a vehicle, wherein the light source is arranged behind a rear-side focal point of the projection lens; a reflector for forward reflecting light from the light source toward the optical axis, and a unit driving source for the vertically changing mechanism, the laterally changing mechanism, and the pattern changing mechanism, the unit driving source is arranged below the reflector.

According to the thus constituted vehicle headlamp, the unit driving source is arranged below the reflector, by which space inside the lamp chamber can be used effectively, thus preventing the vehicle headlamp in its entirety from being made greater in size and weight.

Further, in the above-constituted vehicle headlamp, the sub-lamp unit may include a projection lens arranged on an optical axis extending in a longitudinal direction of a vehicle, and the light source may be arranged in a vicinity of a rear-side focal point of the projection lens.

According to the thus constituted vehicle headlamp, the light source is directly arranged at the rear-side focal point of the projection lens to eliminate a necessity for the reflector. Therefore, it is possible to save space for attaching a sub-lamp unit in the longitudinal direction of a vehicle and also to make the sub-lamp unit lighter in weight.

Further, in the above-constituted vehicle headlamp, the pattern changing mechanism may include: a cylindrical-type optical control member that encloses the projection lens and the light source in the horizontal direction; and an optical control member rotationally-moving mechanism that rotationally move the optical control member around a vertical axis.

According to the thus constituted vehicle headlamp, a major member for emitting light for forming light distribution patterns is arranged inside an optical control member formed in a cylindrical shape and the optical control member is allowed to move rotationally around the vertical axis by the optical control member rotationally-moving mechanism, thus making it possible to control light emitted from the projection lens. Thereby, the pattern changing mechanism, which is a mechanism for controlling emitted light, can be made compact.

Further, in the above-constituted vehicle headlamp, the optical control member may include a plurality of pattern forming portions which are divided in a circumferential direction.

According to the thus constituted vehicle headlamp, the optical control member is allowed to move rotationally around the vertical axis by the optical control member rotationally-moving mechanism, by which any given one selected from plural types of pattern forming portions of the optical control member which are divided in the circumferential direction is arranged in front of the projection lens selectively depending on a rotational angle. Then, plural types of light distribution patterns can be formed in a simple structure and quickly.

Further, in the above-constituted vehicle headlamp, a rotational axis of the optical control member may be coaxial with a rotational axis of the sub-lamp unit by the laterally changing mechanism, and the optical control member rotationally-moving mechanism and the laterally changing mechanism may be fixed to a base member.

According to the thus constituted vehicle headlamp, the optical control member rotationally-moving mechanism and the laterally changing mechanism, with their rotational axes being coaxial with each other, are allowed to work together, thus making it possible to form light distribution patterns dealing with various traveling conditions of a vehicle. For example, in working together with a swivel mechanism, a light distribution pattern can be changed.

Further, in the above-constituted vehicle headlamp, the vertically changing mechanism may rotationally actuate only the projection lens around a horizontal axis which is orthogonal to the optical axis.

According to the thus constituted vehicle headlamp, there is provided such a structure that only the projection lens is allowed to rotationally move, by which a rotationally-moving mechanism can be made smaller in size and a driving source smaller in driving output can be used, as compared with an ordinary vertically changing mechanism in which the light source and the projection lens to be arranged on the optical axis are allowed to rotationally move in an integrated manner, thereby a vertically changing mechanism can be made compact.

According to one or more embodiments of the invention, the vehicle headlamp is provided with a main lamp unit fixed and arranged inside a lamp chamber to secure a light quantity of main light distribution and a sub-lamp unit capable of changing and forming light distribution patterns by using a semiconductor light emitting element as a light source. Then, only the sub-lamp unit as an auxiliary lamp for changing and forming light distribution patterns is given a movable structure, thus making it possible to make compact a unit driving source of each changing mechanism.

Therefore, it is possible to add functions of forming various types of preferable light distribution patterns depending on traveling conditions of a vehicle, without making the vehicle headlamp in its entirety greater in size and weight. As a result, space for attaching the headlamp can be saved to reduce designing restrictions and improve design characteristics and traveling safety.

Other aspects and advantages of the invention will be apparent from the following description, the drawings and the claims.

BRIEF DESCRIPTION OF THE DRAWINGS

FIGS. 9(a) to 9(c) are horizontal sectional views of the optical control member shown in FIG. 6.

DETAILED DESCRIPTION OF THE EXEMPLARY EMBODIMENTS

Hereinafter, an exemplary embodiment of the invention is explained.

Figure 1:
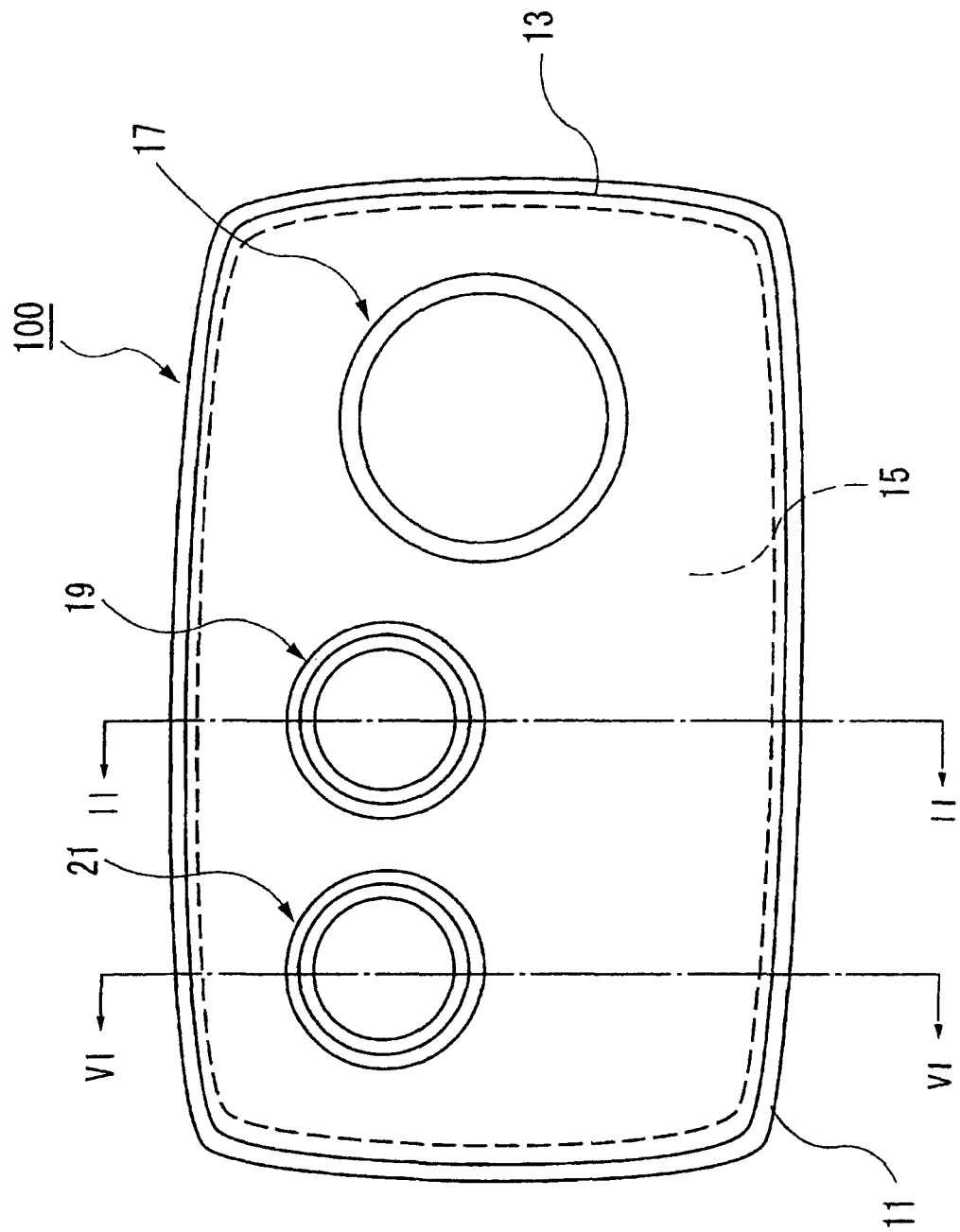
FIG. 1 is a front elevational view of a vehicle headlamp related to one embodiment of the present invention.
Figure 2:
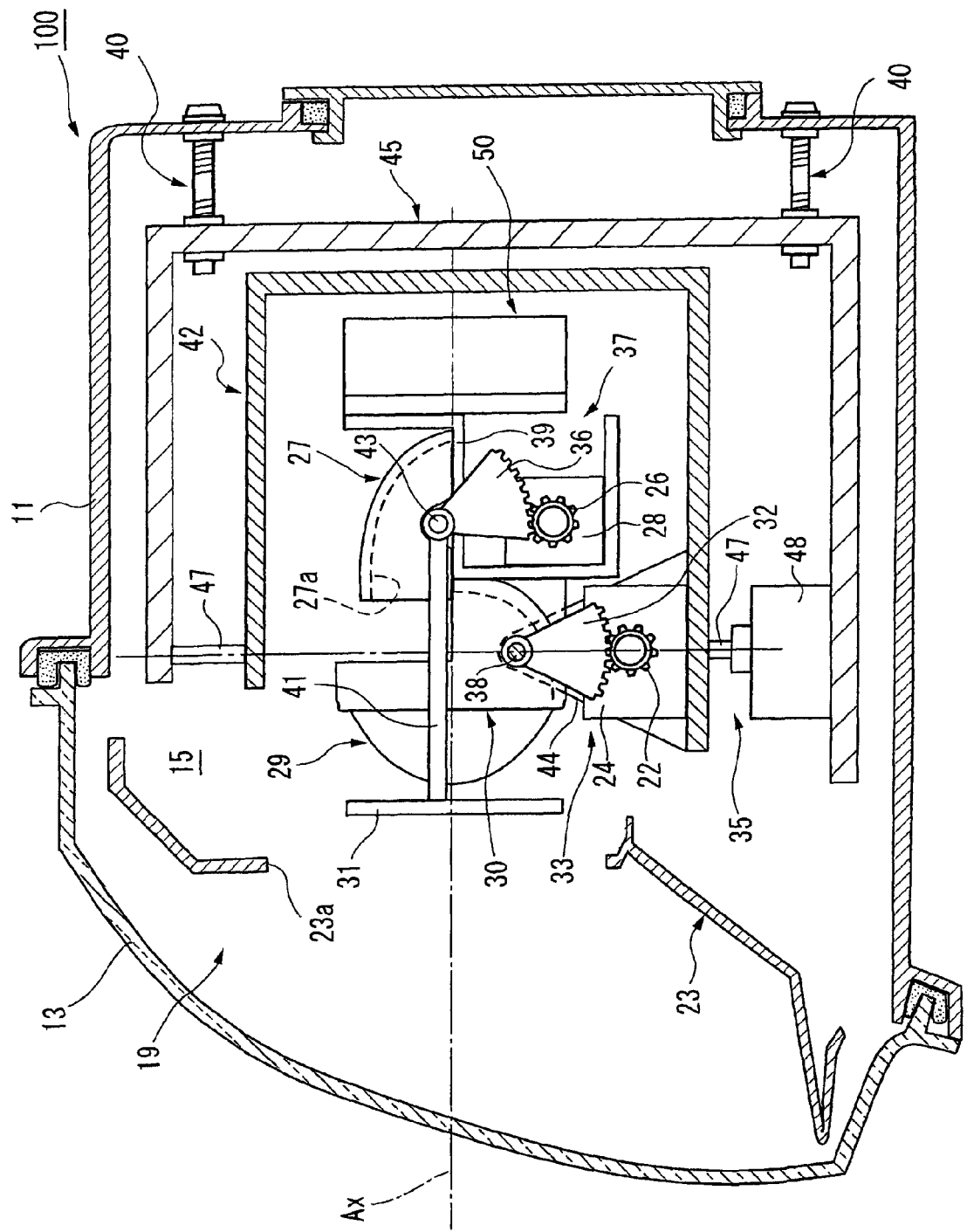
FIG. 2 is a sectional view of the vehicle headlamp shown in FIG. 1 which is taken along line II to II.
Figure 3:
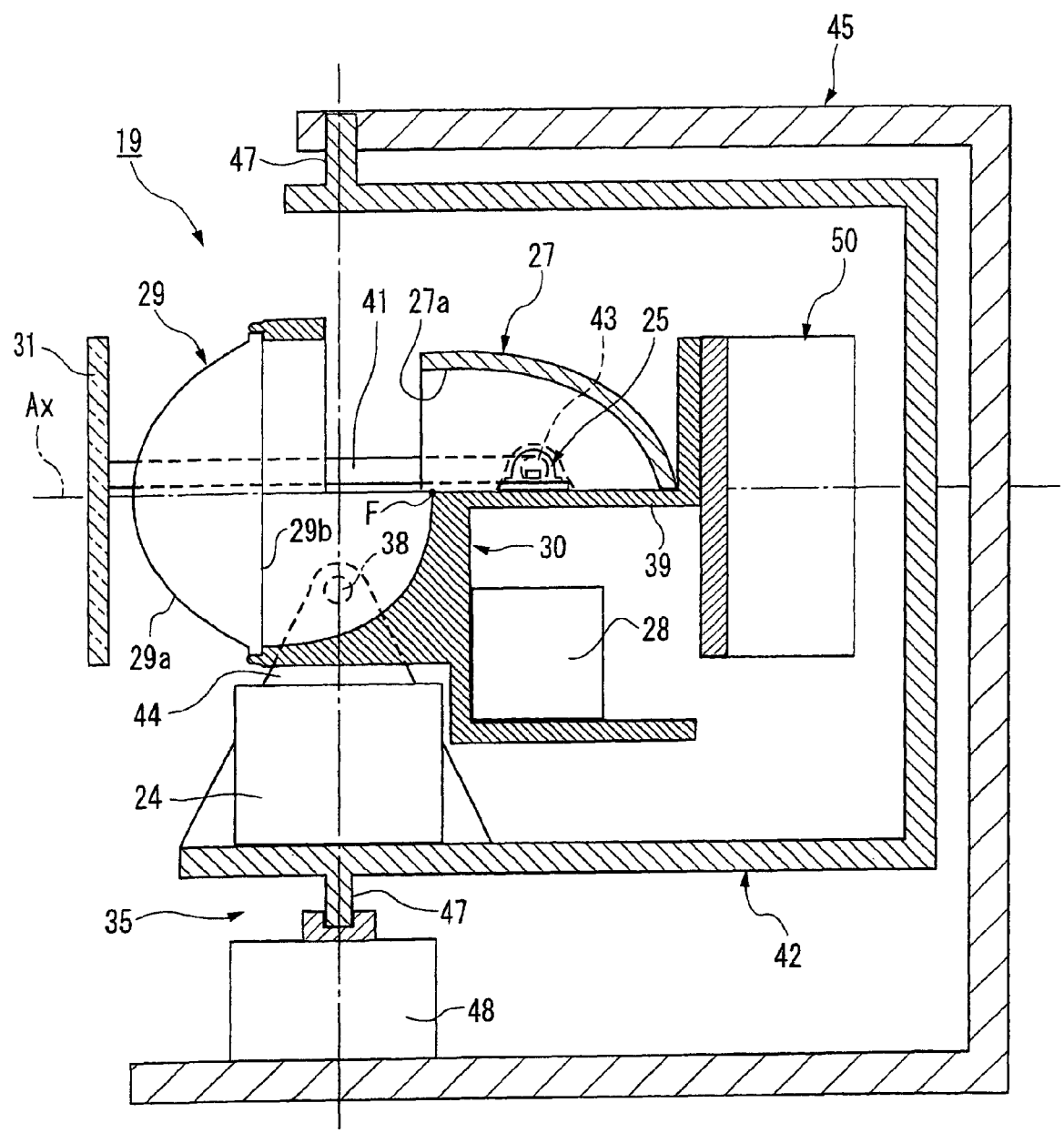
FIG. 3 is a longitudinal sectional view of the first sub-lamp unit shown in FIG. 2.
Figure 4:
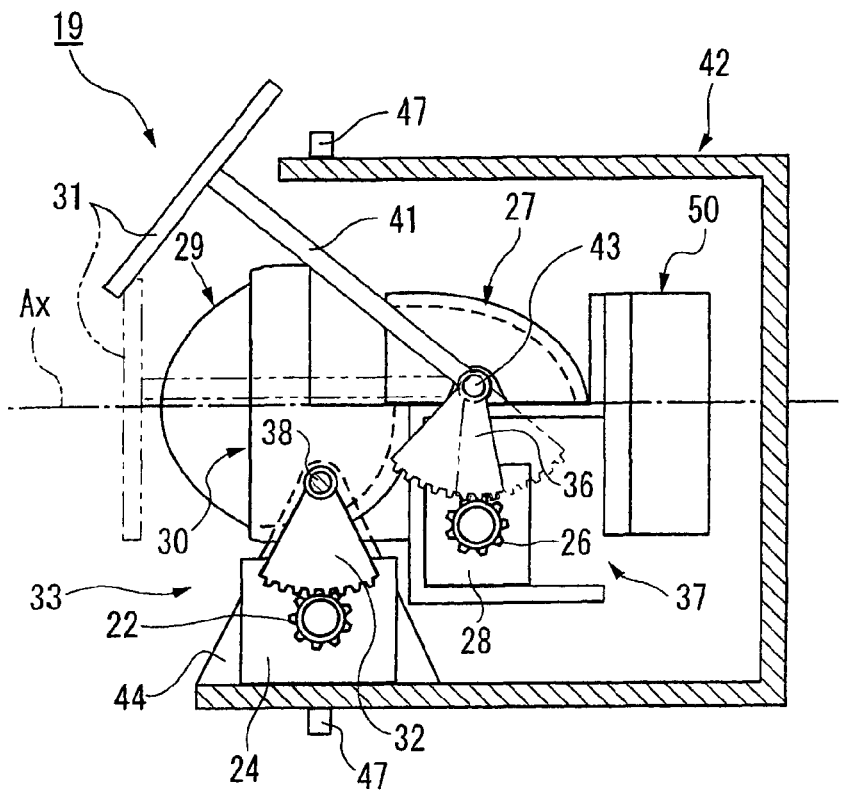
FIG. 4 is a view for explaining motions of the first sub-lamp unit shown in FIG. 2.
Figure 5:
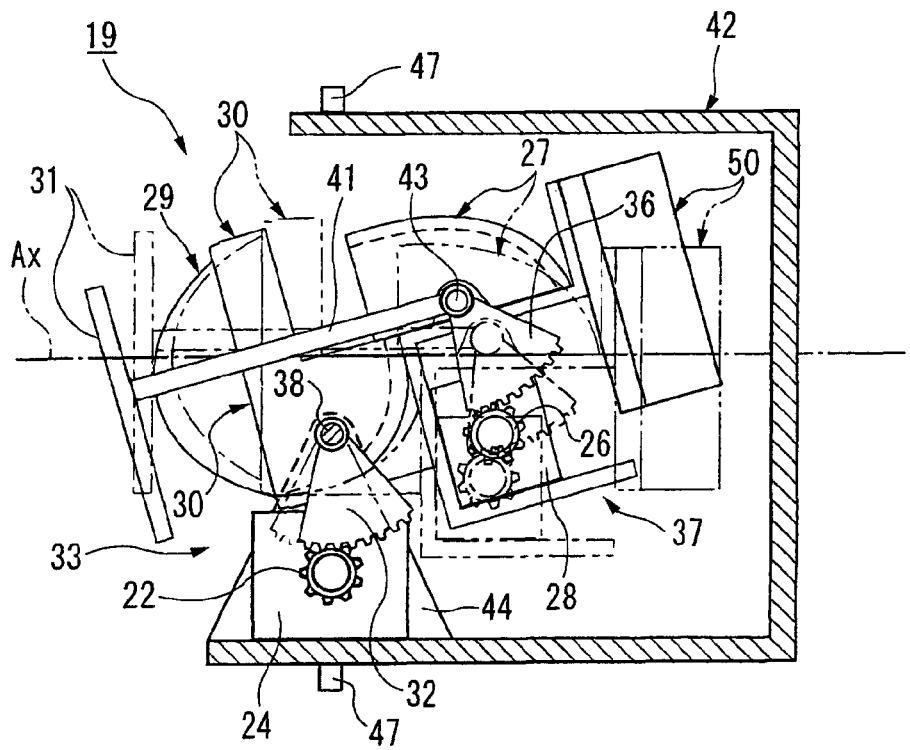
FIG. 5 is a view for explaining motions of the first sub-lamp unit shown in FIG. 2.

FIG. 1 is a front elevational view showing a vehicle headlamp of the exemplary embodiment of the present invention. FIG. 2 is a sectional view of the vehicle headlamp in FIG. 1 taken along line II to II. FIG. 3 is a longitudinal sectional view of a first sub-lamp unit given in FIG. 2. FIG. 4 and FIG. 5 are views for explaining motions of the first sub-lamp unit given in FIG. 2.

As shown in FIG. 1 and FIG. 2, the vehicle headlamp 100 of the present embodiment is equipped with a main lamp unit 17, a first sub-lamp unit 19 and a second sub-lamp unit 21 inside a lamp chamber 15 formed with a lamp body 11 and a translucent cover (cover) 13.

Further, an extension 23 is arranged between these units, 17, 19, 21 and the translucent cover 13 so as to cover a gap when viewed in front of the lamp fitting. The extension 23 is formed with an opening portion 23a enclosing each of the units 17, 19, 21 in the vicinity of the front end portion.

Figure 6:
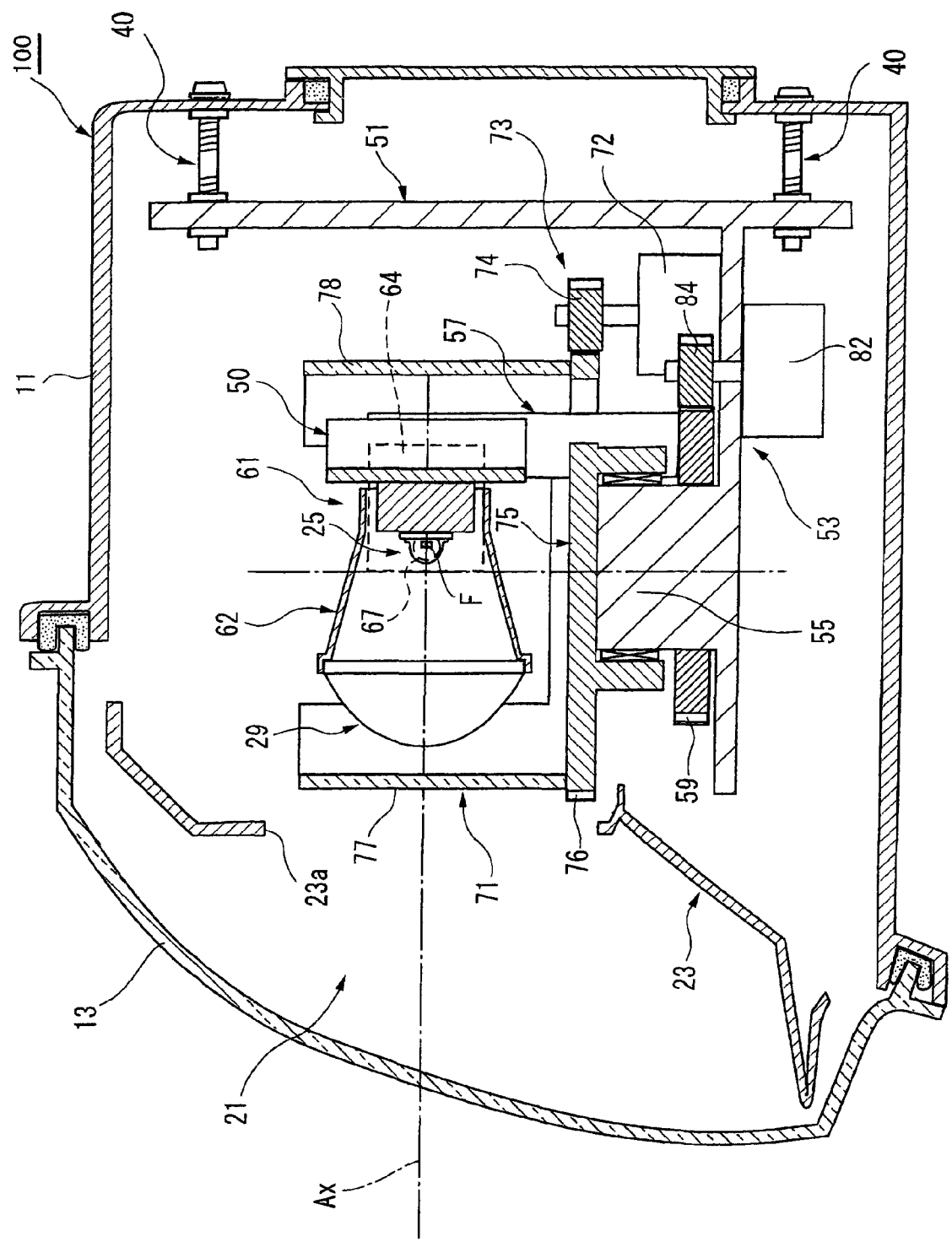
FIG. 6 is a sectional view of the vehicle headlamp shown in FIG. 1 which is taken along line VI to VI.

Any of the main lamp unit 17, the first sub-lamp unit 19 and the second sub-lamp unit 21 is provided with an optical axis Ax extending in the longitudinal direction of a vehicle and supported on the lamp body 11 so as to tilt in the vertical and lateral directions via an aiming mechanism 40 (refer to FIG. 2 and FIG. 6). In a stage that aiming adjustment is completed by the aiming mechanism 40, the optical axis Ax of each of the units 17,19,21 is to extend to a downward direction at about 0.5° to 0.6° with respect to the longitudinal direction of a vehicle.

The main lamp unit 17 is a projector-type lighting unit (PES) which is equipped with, for example, a discharge bulb, a reflector (not illustrated) for reflecting light from the discharge bulb on the projection lens side at a predetermined light distribution pattern, and a shade (not illustrated). The main lamp unit 17 is fixed to the lamp body 11 via only the aiming mechanism, and free of any other components such as a light-distribution changeable mechanism. Thereby, a simple attaching structure is realized. It is noted that the discharge bulb uses a high-pressure metallic vapor discharge bulb such as a metal halide lamp emitting white light and a high-intensity discharge bulb (HID) etc.

A reflecting surface is formed on an inner concave face of the reflector by aluminum vapor deposition or silver coating etc. The reflecting surface of the reflector is a free-form reflecting surface based on, for example, a rotating parabolic surface. The main lamp unit 17 provides a light distribution pattern for passing lights when the discharge bulb is switched on. The main lamp unit 17, which is a basic unit, may be any structure of projector optical systems and parabola optical systems. Further, a light source of the main lamp unit 17 may be any of halogen lamps, HIDs and white LEDs.

Next, an explanation will be made for the first sub-lamp unit 19.

As shown in FIG. 2 and FIG. 3, the first sub-lamp unit 19 is a projector-type lighting unit and equipped with a semiconductor light emitting element 25 as a light source, a reflector 27, a projection lens 29, a diffusion filter 31, a vertically changing mechanism 33, a laterally changing mechanism 35 and a pattern changing mechanism 37.

The semiconductor light emitting element 25 is a white light emitting diode having a light emitting chip with dimensions of about 1 mm×1 mm and arranged upward in the vertical direction, with the illumination axis placed on the optical axis Ax, in a state that it is supported on a base plate 39 of the base member 30 which is thermally conductive. A heat sink 50, which is a heat dissipating portion, is attached behind the base plate 39 and is able to dissipate efficiently heat from the semiconductor light emitting element 25.

The first sub-lamp unit 19 uses the semiconductor light emitting element 25 such as a light-emitting diode (LED) as a light source, thereby providing the following effects. That is, optical units can be made smaller in size. The light source is controlled for electric power, thereby easily changing brightness (less influenced by the service life of the light source). Toning can be effected in combination with LEDs having different colors. Since the semiconductor light emitting element 25 is free of heat generation resulting from light in itself, there is provided a wider selection of structures and materials of components, for example, a shade structure of PES optical systems (where a light distribution pattern is changed depending on a shade configuration) and materials of color filters (where the filters are used for changing colors) etc. Light is used more efficiently. As a matter of course, a semiconductor light emitting element other than LEDs may be used in the first sub-lamp unit 19.

The reflector 27 attached to the base member 30 is provided with a reflecting surface 27a for forward reflecting light from the light emitting device 25 toward the optical axis Ax. The reflecting surface 27a is formed to have a cross section which is substantially in an ellipsoidal shape and set in such a manner that the eccentricity is gradually increased from the vertical cross section to the horizontal cross section. Thereby, light reflected on the reflecting surface 27a from the light emitting device 25 is substantially collected in the vicinity of the rear-side focal point F of the projection lens 29 within the vertical cross section.

The projection lens 29 is constituted as a flat convex lens in which a front-side surface 29a is a convex curved surface and a rear-side surface 29b is a flat surface, and arranged on the optical axis Ax. Then, the projection lens 29 is designed to forward project an image on the focal point plane including the rear-side focal point F as a reverted image. The convex curved surface constituting the front-side surface 29a of the projection lens 29 is constituted with an aspheric surface formed so as to locate the rear-side focal point F of the projection lens 29 on the optical axis Ax.

The diffusion filter 31 diffuses light emitted from the projection lens 29, thereby making it possible to form different light distribution patterns. The diffusion filter 31 is fixed to the leading end of a supporting arm 41. A base end of the supporting arm 41 is rotatably supported by a filter rotational shaft 43. The diffusion filter 31 may have functions as a color filter for changing the color temperature of light.

As shown in FIG. 2, a supporting member 45 is fixed on the lamp body 11 via the aiming mechanism 40, and a laterally changing mechanism 35 for changing the illuminating direction of the first sub-lamp unit 19 to the lateral direction is fixed on the supporting member 45.

The laterally changing mechanism 35 is a swivel mechanism in which a unit driving source 48 sways and rotates a unit mounting member 42 around the vertical axis at the center of a swivel rotational shaft 47.

As shown in FIG. 3, the swivel rotational shaft 47 on the lower side is coupled to an output shaft of the unit driving source 48 of the laterally changing mechanism 35 provided at a horizontal portion of the supporting member 45. The unit driving source 48 is driven to rotate the output shaft, by which the unit mounting member 42 is to be driven and rotated around the swivel rotational shaft 47.

Then, in response to lateral operation by a steering wheel, the output shaft of the unit driving source 48 is rotated, thereby swiveling and driving the semiconductor light emitting element 25 mounted on the unit mounting member 42, the reflector 27, the projection lens 29, the diffusion filter 31, the vertically changing mechanism 33 and the pattern changing mechanism 37 laterally in an integrated manner.

Therefore, an additional light distribution pattern can be formed beside an ordinary low-beam light distribution pattern and a sufficient illumination is given ahead of the road surface in the turning direction, thereby making it possible to improve the visibility.

Further, the vertically changing mechanism 33 for changing the illuminating direction of the first sub-lamp unit 19 to a vertical direction is fixed on the unit mounting member 42. The vertically changing mechanism 33 is a leveling mechanism in which the unit driving source 24 levels and drives a base member 30 around the horizontal axis at the center of a unit vertical rotational shaft 38.

As shown in FIG. 2, the base member 30 is pivotally supported respectively by a pair of unit supporting plates 44, 44 where unit vertical rotational shafts 38, 38 projected horizontally in the lateral direction therebelow are arranged at a horizontal portion of the unit mounting member 42 and allowed to rotate freely around the horizontal axis intersecting with the optical axis Ax.

A pinion gear 22 is fixed to the output shaft of the unit driving source 24 of the vertically changing mechanism 33 arranged at the horizontal portion of the unit mounting member 42, and the pinion gear 22 is meshed with a fan-type gear 32 fixed to one of unit vertical rotational shafts 38.

In other words, when the unit driving source 24 is driven to rotate the output shaft, the unit vertical rotational shaft 38 is rotated via the pinion gear 22 and the fan-type gear 32. Thereby, as shown in FIG. 5, the base member 30 is to be swayed and rotated at the center of the unit vertical rotational shaft 38.

Then, according to instructions of an electronically controlled unit (not illustrated), the output shaft of the unit driving source 24 is rotated, thereby leveling and driving the semiconductor light emitting element 25 provided on the base member 30, the reflector 27, the projection lens 29, the diffusion filter 31 and the pattern changing mechanism 37 vertically in an integrated manner.

Therefore, for example, in order to detect a horizontal state of a vehicle (leveling), on the basis of output of a height sensor for detecting the respective heights of the anterior and posterior shafts, the electronically controlled unit deflects and controls the first sub-lamp units 19 of vehicle lamp fittings 100 equipped respectively on the right and the left in front of a vehicle in the vertical direction, thus making it possible to change automatically characteristics of the light distribution.

Further, a pattern changing mechanism 37 for changing light distribution patterns of the first sub-lamp unit 19 is fixed to the base member 30. The pattern changing mechanism 37 sways and rotates the diffusion filter 31 around the horizontal axis at the center of the filter rotational shaft 43 by using the unit driving source 28.

As shown in FIG. 2, base ends of a pair of supporting arms 41, 41 are supported respectively by the filter rotational shafts 43, 43 projected horizontally in the lateral direction on the side of the reflector 27 of the base member 30 so as to be rotated freely and also rotated freely around the horizontal axis intersecting with the optical axis Ax.

A pinion gear 26 is fixed to the output shaft of the unit driving source 28 of the pattern changing mechanism 37 provided at a horizontal portion of the base member 30. The pinion gear 26 is meshed with a fan-type gear 36 fixed to the base end of one of the supporting arms 41.

In other words, when the unit driving source 28 is driven to rotate the output shaft, the supporting arm 41 is rotated via the pinion gear 26 and the fan-type gear 36. Thereby, a diffusion filter 31 fixed at the leading end is to be swayed and rotated at the center of the filter rotational shaft 43.

Then, according to instructions of the electronically controlled unit (not illustrated), when the output shaft of the unit driving source 28 is rotated, the diffusion filter 31 is moved to a position arranged in front of the projection lens 29 to transmit light emitted from the projection lens 29 (a position given in FIG. 3) or to a position arranged obliquely above the projection lens 29 not to transmit light emitted from the projection lens 29 (a position given in FIG. 4).

Therefore, as shown in FIG. 3, in the first sub-lamp unit 19 where the diffusion filter 31 is arranged in front of the projection lens 29, emitted light which is transmitted through the diffusion filter 31 is diffused. Further, as shown in FIG. 4, where the diffusion filter 31 is moved obliquely above and light emitted from the projection lens 29 is not transmitted through the diffusion filter 31, it is given as parallel light. In other words, emitted light which is not transmitted through the diffusion filter 31 is different in light distribution to be obtained from that which is transmitted through the diffusion filter 31.

More specifically, the diffusion filter 31 is covered in front of the projection lens 29, by which the light distribution pattern of the first sub-lamp unit 19 is given such a configuration that it is spread laterally. On the other hand, where the diffusion filter 31 is moved obliquely above, the light distribution pattern of the first sub-lamp unit 19 is given such a configuration that it is focused at the center to some extent.

Thereby, the light distribution pattern of the first sub-lamp unit 19, which is different, is superimposed on the light distribution pattern formed by the main lamp unit 17, making it possible to change a whole light distribution pattern of the vehicle headlamp 100.

Further, the first sub-lamp unit 19 of the present embodiment is equipped with a projection lens 29 arranged on the optical axis Ax extending in the longitudinal direction of a vehicle, a semiconductor light emitting element 25 arranged behind from the rear-side focal point F of the projection lens 29, and a reflector 27 for forward reflecting light from the semiconductor light emitting element 25 toward the optical axis Ax. The respective unit driving sources 48, 24, 28 of the laterally changing mechanism 35, the vertically changing mechanism 33 and the pattern changing mechanism 37 are arranged below the reflector 27.

Therefore, space inside the lamp chamber 15 can be used effectively, thus making it possible to prevent the vehicle headlamp 100 in its entirety from being made greater in size and weight. Further, light from the semiconductor light emitting element 25 is once collected at the rear-side focal point F of the projection lens 29 by the reflector 27 and illuminated by the projection lens 29. It is, therefore, possible to increase the use efficiency of light emitted from the semiconductor light emitting element 25.

Next, an explanation will be made for the second sub-lamp unit 21.

Figure 7:
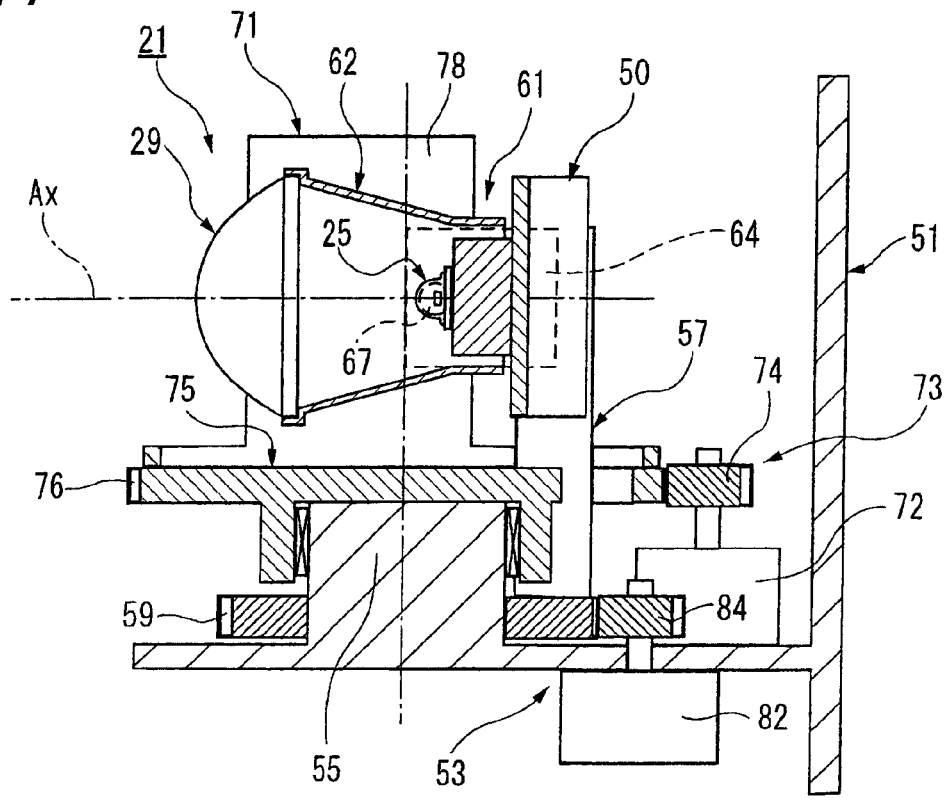
FIG. 7 is a view for explaining motions of the second sub-lamp unit shown in FIG. 6.
Figure 8:
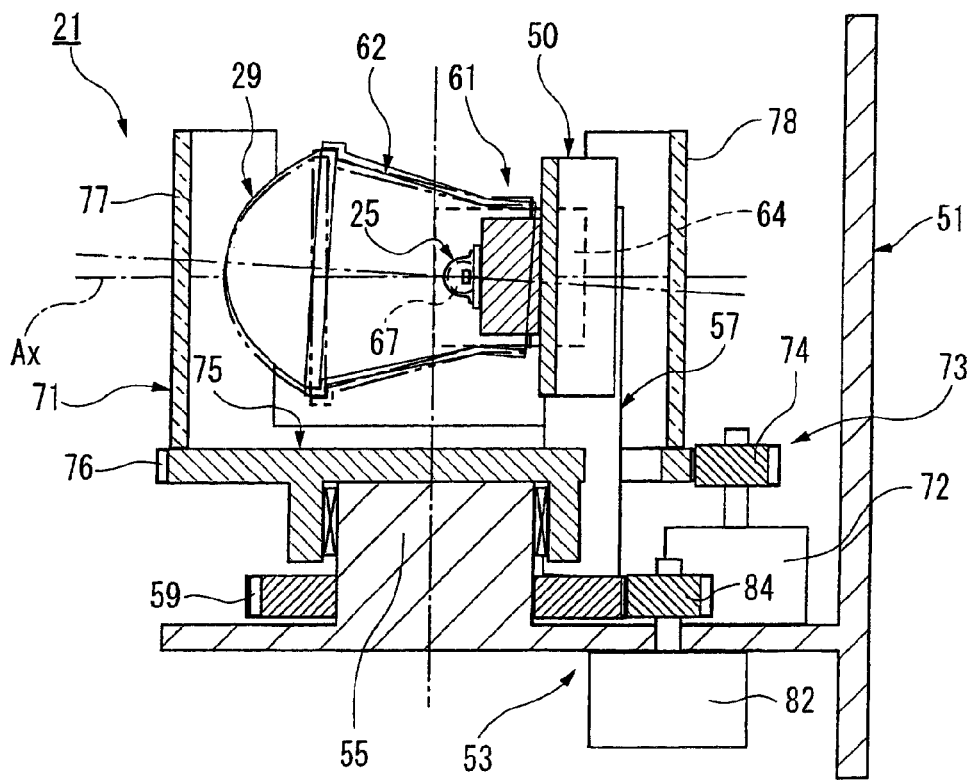
FIG. 8 is a view for explaining motions of the second sub-lamp unit shown in FIG. 6.

FIG. 6 is a sectional view of the vehicle headlamp given in FIG. 1 which is taken along line VI to VI. FIG. 7 and FIG. 8 are views for explaining motions of the second sub-lamp unit given in FIG. 6. The same constituents as those in FIG. 2 are given the same symbols, an overlapping explanation of which will be omitted here.

As shown in FIG. 6, the second sub-lamp unit 21 is equipped with a projection lens 29 arranged on the optical axis Ax extending in the longitudinal direction of a vehicle, semiconductor light emitting element 25, an optical control member 71, a vertically changing mechanism 61, a laterally changing mechanism 53 and a pattern changing mechanism 73.

The semiconductor light emitting element 25 is arranged at the rear-side focal point F of the projection lens 29 in a state that the illumination axis is in alignment with the optical axis Ax. There is eliminated a necessity for the reflector 27. It is accordingly possible to save space for attaching a sub-lamp unit and also make the sub-lamp unit in whole lighter in weight.

A supporting member 51 is fixed to the lamp body 11 via the aiming mechanism 40, and a laterally changing mechanism 53 for changing the illuminating direction of the second sub-lamp unit 21 to the lateral direction is fixed to the supporting member 51.

The laterally changing mechanism 53 is a swivel mechanism in which the unit driving source 53 sways and rotates the unit mounting member 57 around the vertical axis at the center of a fixed shaft 55.

As shown in FIG. 6, a pinion gear 84 is fixed to the output shaft of the unit driving source 82 of the laterally changing mechanism 53 provided at a horizontal portion of the supporting member 51, and the pinion gear 84 is meshed with an annular gear 59 provided at a lower part of the unit mounting member 57.

More specifically, when the unit driving source 82 is driven to rotate the output shaft, the unit mounting member 57 is to be swayed and rotated at the center of the fixed shaft 55 via the pinion gear 84 and the annular gear 59.

Then, in response to left and right steering of the steering wheel, the output shaft of the unit driving source 82 is rotated, thereby swiveling and driving the semiconductor light emitting element 25 mounted on the unit mounting member 57, the projection lens 29 and the vertically changing mechanism 61 laterally in an integrated manner.

Therefore, an additional light distribution pattern can be formed on the side of an ordinary low-beam light distribution pattern, making it possible to illuminate sufficiently the road surface ahead in the turning direction, and to improve the visibility.

Further, a vertically changing mechanism 61 for changing the illuminating direction of the second sub-lamp unit 21 to the vertical direction is fixed on the unit mounting member 57. The vertically changing mechanism 61 is a leveling mechanism in which a unit driving source 64 levels and drives a lens holder 62 in the vertical direction around the horizontal axis at the center of a vertical rotational shaft 67.

As shown in FIG. 6, the lens holder 62 supporting the projection lens 29 is fixed to the output shaft of the unit driving source 64 where a vertical rotational shaft 67 projected on the side face horizontally in the right direction is fixed to the unit mounting member 57 and allowed to rotate around the horizontal axis intersecting with the optical axis Ax.

In other words, when the unit driving source 64 is driven to rotate the output shaft, the vertical rotational shaft 67 is rotated, by which the lens holder 62 is to be swayed and rotated at the center of the vertical rotational shaft 67.

Then, according to instructions of an electronically controlled unit (not illustrated), when the output shaft of the unit driving source 64 is rotated, as shown in FIG. 8, only the projection lens 29 retained by the lens holder 62 is leveled and driven vertically.

Therefore, as compared with the vertically changing mechanism 33 of the above first sub-lamp unit 19 which allows the reflector 27 to move rotationally in an integrated manner with the light emitting device 25 arranged on the optical axis Ax and the projection lens 29, the vertically changing mechanism 61 of the second sub-lamp unit 21 can use the unit driving source 64 in which a rotating mechanism is made smaller in size to decrease a driving output, thus making compact the vertically changing mechanism 61.

Further, a pattern changing mechanism 73 for changing light distribution patterns of the second sub-lamp unit 21 is provided on the fixed shaft 55 of the supporting member 51.

The pattern changing mechanism 73 of the second sub-lamp unit 21 is equipped with an substantially cylindrical optical control member 71 enclosing the projection lens 29 and the semiconductor light emitting element 25 and a unit driving source 72 which allows the optical control member 71 to move rotationally around the vertical axis at the center of the fixed shaft 55.

As shown in FIG. 6, a rotating base 75 is provided below the optical control member 71, and the rotating base 75 is rotatably placed on the fixed shaft 55. A pinion gear 74 is fixed to the output shaft of the unit driving source 72 of the pattern changing mechanism 73 provided at a horizontal portion of the supporting member 51, and the pinion gear 74 is meshed with an annular gear 76 formed on an outer circumference of the rotating base 75.

In other words, when the unit driving source 72 is driven to rotate the output shaft, the rotating base 75 is rotated via the pinion gear 74 and the annular gear 76, by which the optical control member 71 provided on the rotating base is to be swayed and rotated at the center of the fixed shaft 55.

The optical control member 71 is equipped with plural types of pattern forming portions 77, 78 (two types in the present embodiment) which are divided circumferentially. The optical control member 71 is allowed to move rotationally around the vertical axis by the unit driving source 72, by which the pattern forming portions 77,78 of the optical control member 71 divided circumferentially are arranged in front of the projection lens 29 selectively depending on a rotational angle. Therefore, it becomes possible to form three types of light distribution patterns in a simple structure and quickly.

Then, according to instructions of an electronically controlled unit (not illustrated), when the output shaft of the unit driving source 72 is rotated, the optical control member 71 is moved to a position at which the pattern forming portion 77 is arranged in front of the projection lens 29 to transmit light emitted from the projection lens 29 (a position given in FIG. 6), to a position at which the pattern forming portions 77,78 will not transmit light emitted from the projection lens 29 (a position given in FIG. 7) or to a position at which the pattern forming portion 78 is arranged in front of the projection lens 29 to transmit light emitted from the projection lens 29 (refer to FIG. 9(c)).

Therefore, as shown in FIG. 9(a), in the second sub-lamp unit 21, a pattern forming portion 77, which is a diffusion filter, is arranged, for example, in front of the projection lens 29, by which emitted light transmitted through the pattern forming portion 77 is diffused. Further, as shown in FIG. 9(b), where the optical control member 71 is moved and light emitted from the projection lens 29 is not transmitted through the pattern forming portions 77, 78, it is given as parallel light. Still further, as shown in FIG. 9(c), a pattern forming portion 78, which is a yellow filter, is arranged, for example, in front of the projection lens 29, by which emitted light transmitted through the pattern forming portion 78 is given as fog lamp light. In other words, the emitted light which is not transmitted through the pattern forming portions 77, 78 is different in light distribution or color to be obtained from that which is transmitted through the pattern forming portion 77 or the pattern forming portion 78.

More specifically, the pattern forming portion 77 is covered in front of the projection lens 29, by which the light distribution pattern of the second sub-lamp unit 21 is given such a configuration that it is spread laterally. Further, where the pattern forming portions 77, 78 are moved to the left and right sides of the projection lens 29, the light distribution pattern of the second sub-lamp unit 21 is given such a configuration that it is focused at the center to some extent. Further, the pattern forming portion 77 is covered in front of the projection lens 29, by which light emitted from the second sub-lamp unit 21 is given as fog lamp light.

Thereby, the light distribution pattern of the second sub-lamp unit 21 which is different is superimposed on the light distribution pattern formed by the main lamp unit 17, making it possible to change a whole light distribution pattern of the vehicle headlamp 100.

Further, as exemplified in FIGS. 9(a) to 9(c), an extension 86 arranged on the outer circumference of a cylindrical optical control member 71 is partially formed by a light guiding body 88 through which light can be transmitted, thereby providing such a constitution in which light other than effective light from the semiconductor light emitting element 25 can be used to illuminate the second sub-lamp unit 21 in whole.

Still further, in the second sub-lamp unit 21 of the present embodiment, a major member for emitting light to form a light distribution pattern is arranged inside a cylindrically shaped optical control member 71. The optical control member 71 is allowed to move rotationally around the vertical axis by the unit driving source 72, by which light emitted from the projection lens 29 can be controlled. Thereby, it is possible to make compact the pattern changing mechanism 73 which is a mechanism for controlling emitted light.

Further, since the fixed shaft 55 is used commonly in the second sub-lamp unit 21, the rotational axis of the optical control member 71 is coaxial with the rotational axis of the second sub-lamp unit 21 in the laterally changing mechanism 53. The pattern changing mechanism 73 and the laterally changing mechanism 53, with their rotational axes being coaxial with each other, are allowed to work together, thus making it possible to form light distribution patterns dealing with various traveling conditions of a vehicle. For example, in working together with a swivel mechanism, a light distribution pattern can be changed.

Next, an explanation will be made for motions of the above-constituted vehicle headlamp 100.

Figure 10A:
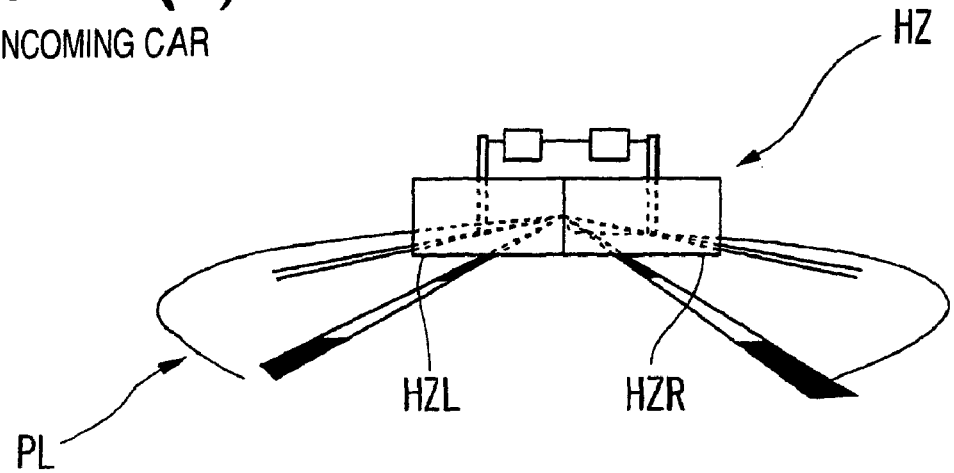
FIGS. 10(a) to 10(c) are views for explaining examples of light distribution patterns when the vehicle headlamp shown in FIG. 1 is used as a high beam.
Figure 10B:
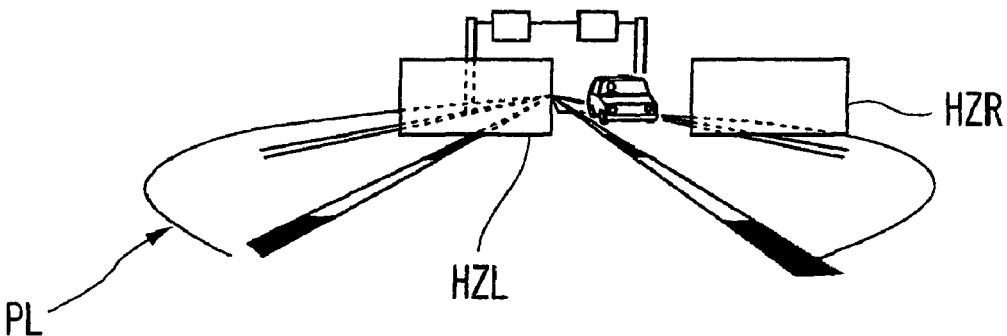
Figure 10C:
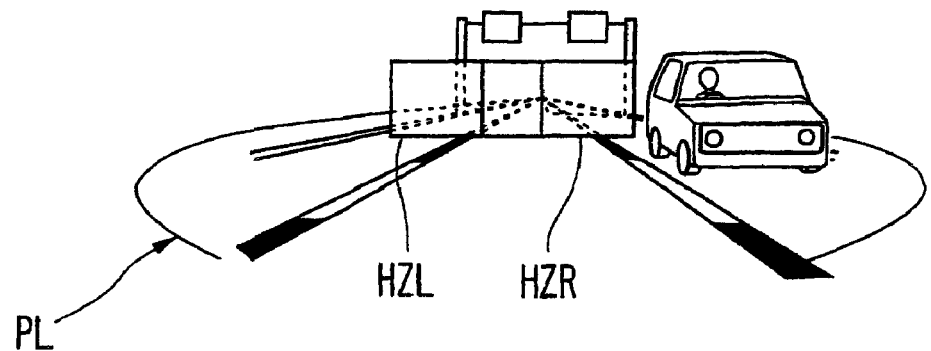

FIGS. 10(a), 10(b) and 10(c) show examples of light distribution patterns when used as a high-beam headlamp. FIG. 11 (a) and (b) show examples of light distribution patterns under various traveling conditions.

The vehicle headlamp 100 forms a low-beam light distribution pattern PL based on a basic passing beam (low beam) by the main lamp unit 17. The low-beam light distribution pattern PL is provided with a cut-off line different in level laterally at the upper edge. The cut-off line, which is different in level laterally, extends horizontally, and a part of the oncoming traffic lane on the right side is formed as a lower-step cut-off line, while a part of its own traffic lane on the left side is formed as an upper-step cut-off line which is raised via an inclined part from the lower-step cut-off line.

In an example in which a light distribution pattern of the first sub-lamp unit 19 is synthesized with that of the second sub-lamp unit 21 as a high beam in the main lamp unit 17 of the vehicle headlamp 100, where there is no oncoming vehicle as shown in FIG. 10(a), a hot zone HZ, which is a high intensity region, is formed in such a manner that an inclined part of the low-beam light distribution pattern PL by the main lamp unit 17 is enclosed by converging light of the first sub-lamp unit 19 and the second sub-lamp unit 21. The left-side vehicle headlamp 100 and the right-side vehicle headlamp 100 are used to illuminate respectively a front left-side hot zone HZL and a front right-side hot zone HZR.

For example, where an oncoming vehicle appears in the distance as shown in FIG. 10(b), light of the front right-side hot zone HZR is moved to the right, thereby suppressing glaring light to the oncoming vehicle. Then, where the oncoming vehicle comes closer as shown in FIG. 10(c), once the light is switched off and light of the front right-side hot zone HZR is then moved to the left, glaring light to the oncoming vehicle is suppressed.

Further, in the case of rain, white lines on a road surface or edge stones on a road shoulder are less visible, thereby it is difficult to drive a vehicle. In this instance, light of the first sub-lamp unit 19 and that of the second sub-lamp unit 21 in the vehicle headlamp 100 are collected to illuminate the white lines and the road shoulder in a concentrated manner, thereby improving the visibility.

Figure 11A:
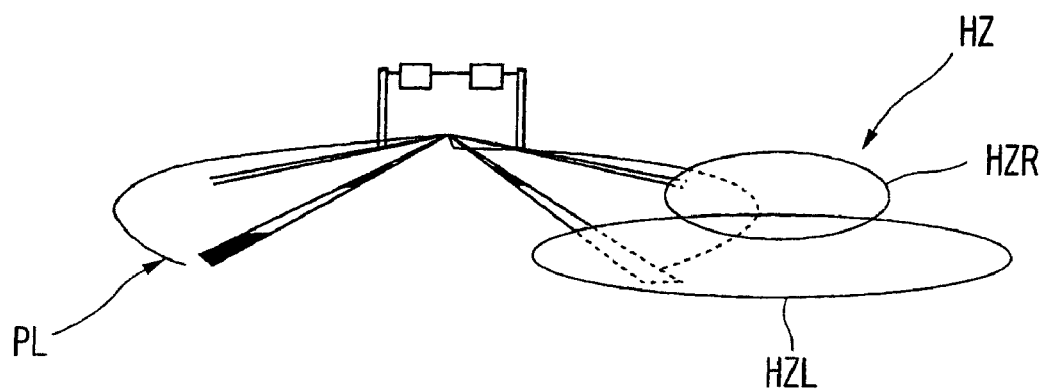
FIGS. 11(a) and 11(b) is views for explaining examples of light distribution patterns of the vehicle headlamp shown in FIG. 1 under various traveling conditions.

Further, on a curved road, illumination light of the first sub-lamp unit 19 and the second sub-lamp unit 21 is diffused and the illuminating direction is also changed. As shown in FIG. 11(a), the illumination area HZ is moved in association with a steering angle and a vehicle speed, thereby securing the field of view in the distance.

Figure 11B:
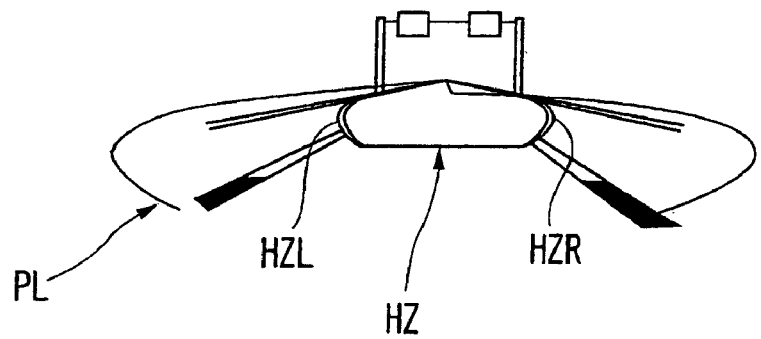

Still further, at the time of high speed traveling, illumination light of the first sub-lamp unit 19 and the second sub-lamp unit 21 is collected, and as shown in FIG. 11(b), thus collected light is illuminated in the distance to form the hot zone HZ, thereby improving the visibility in the distance.

Additionally, for example, pedestrians or fallen objects which is ahead of the vehicle and recognized by an image sensor such as a camera mounted on a vehicle are illuminated in a concentrated manner by the first sub-lamp unit 19 and the second sub-lamp unit 21, thus making it possible to avoid danger.

As described so far, it is possible to improve the visibility under various conditions by adding the first sub-lamp unit 19 and the second sub-lamp unit 21 to the main lamp unit 17.

In the above-described vehicle headlamp 100, besides the main lamp unit 17 for basic light distribution, the first sub-lamp unit 19 and the second sub-lamp unit 21, which are high-performance units, are provided. Therefore, light distribution of the first sub-lamp unit is synthesized with that of the second sub-lamp unit, thus making it possible to form various light distribution patterns.

Then, the main lamp unit 17 (in charge of main light quantity) for securing a light quantity of the main light distribution is given a fixed structure, while only sub-lamp units 19,21 functioning as an auxiliary lamp capable of changing and forming light distribution patterns are given a movable structure, by which unit driving sources (a motor, an actuator and others) of each changing mechanism are made compact, thus making it possible to impart functions of forming various types of preferable light distribution patterns depending on traveling conditions of a vehicle, without making the vehicle headlamp 100 in its entirety greater in size and weight.

In other words, the vehicle headlamp 100 of the present embodiment is equipped with a main lamp unit 17 fixed and arranged inside a lamp chamber 15 to secure a light quantity of main light distribution, a first sub-lamp unit 19 and a second sub-lamp unit 21 capable of changing light distribution patterns by using a semiconductor light emitting element 25 as a light source. Only the first sub-lamp unit 19 and the second sub-lamp unit 21 which function as an auxiliary lamp capable of changing light distribution patterns are given a movable structure, thereby making compact the unit driving sources 24 (64) of vertically changing mechanisms 33 (65), the unit driving sources 48 (82) of laterally changing mechanisms 35 (53) and the unit driving sources 28 (64) of pattern changing mechanisms 37 (73).

Therefore, it is possible to add functions for forming various types of preferable light distribution patterns depending on traveling conditions of a vehicle, without making the vehicle headlamp 100 in its entirety greater in size and weight. As a result, space for attaching the headlamp can be saved to reduce designing restrictions and improve design characteristics and traveling safety.

In the above embodiment, an explanation was made for the vehicle headlamp 100 in which the first sub-lamp unit 19 and the second sub-lamp unit 21, which are high-performance units, are integrally constituted with the main lamp unit 17. The vehicle headlamp of the present invention may be that in which, for example, the first sub-lamp unit 19 or the second sub-lamp unit 21 is equipped outside the headlamp such as a bumper or a grille as a separate body.

Further, the vehicle headlamp of the resent invention may be constituted so as to have the main lamp unit 17 and any one of the first sub-lamp unit 19 and the second sub-lamp unit 21. Three or more sub-lamp units may be used to change the light distribution.

While description has been made in connection with a specific embodiment and modified examples of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS

11: lamp body
13: translucent cover (cover)
15: lamp chamber
17: main lamp unit
19: first sub-lamp unit
21: second sub-lamp unit
25: semiconductor light emitting element (light source)
27: reflector
29: projection lens
30: base member
33, 65: vertically changing mechanism
35, 53: laterally changing mechanism
37, 73: pattern changing mechanism
45, 51: supporting member
55: fixed shaft (rotational shaft of optical control member, rotational shaft of sub-lamp unit)
71: optical control member
77, 78: pattern forming portion
100: vehicle headlamp
Ax: optical axis
F: rear-side focal point of projection lens

What is claimed is:

1. A vehicle headlamp comprising a main lamp unit accommodated in a lamp chamber defined by a lamp body and a cover; and a sub-lamp unit accommodated in the lamp chamber, wherein the sub-lamp unit comprises: a light source comprising a semiconductor light emitting element; a vertically changing mechanism for changing a illuminating direction of the sub- lamp unit in a vertical direction including a first rotation member; a laterally changing mechanism for changing the illuminating direction of the sub- lamp unit in a lateral direction including a second rotation member; and a pattern changing mechanism for changing a light distribution pattern of the sub- lamp unit including a third rotation member, the third rotation member including an optical control member rotationally-moving mechanism that rotationally moves an optical control member around a vertical axis, wherein the optical control member includes a plurality of pattern forming portions which are divided in a circumferential direction.

2. A vehicle headlamp comprising a main lamp unit accommodated in a lamp chamber defined by a lamp body and a cover; and a sub-lamp unit accommodated in the lamp chamber, wherein the sub-lamp unit comprises: a light source comprising a semiconductor light emitting element; a vertically changing mechanism for changing a illuminating direction of the sub- lamp unit in a vertical direction including a first rotation member; a laterally changing mechanism for changing the illuminating direction of the sub-lamp unit in a lateral direction including a second rotation member; and a pattern changing mechanism for changing a light distribution pattern of the sub- lamp unit including a third rotation member, the third rotation member including an optical control member rotationally-moving mechanism that rotationally moves an optical control member around a vertical axis, wherein a rotational axis of the optical control member is coaxial with a rotational axis of the sub-lamp unit by the laterally changing mechanism, and wherein the optical control member rotationally-moving mechanism and the laterally changing mechanism are fixed to a base member.

3. The vehicle headlamp according to claim 1, wherein the sub-lamp unit comprises a projection lens arranged on an optical axis extending in a longitudinal direction of a vehicle, wherein the light source is arranged in a vicinity of a rear-side focal point of the projection lens.

4. The vehicle headlamp according to claim 3, wherein the pattern changing mechanism comprises: a cylindrical-type optical control member that encloses the projection lens and the light source in the horizontal direction.

5. A vehicle headlamp comprising:
a main lamp unit accommodated in a lamp chamber defined by a lamp body and a cover; and
a sub-lamp unit accommodated in the lamp chamber,
wherein the sub-lamp unit comprises:
a light source comprising a semiconductor light emitting element;
a vertically changing mechanism for changing a illuminating direction of the sub-lamp unit in a vertical direction;
a laterally changing mechanism for changing the illuminating direction of the sub-lamp unit in a lateral direction; and
a pattern changing mechanism for changing a light distribution pattern of the sub-lamp unit;
wherein the sub-lamp unit comprises:
a projection lens arranged on an optical axis extending in a longitudinal direction of a vehicle, wherein the light source is arranged in a vicinity of a rear-side focal point of the projection lens;
wherein the vertically changing mechanism rotationally moves only the projection lens around a horizontal axis which is orthogonal to the optical axis.

6. The vehicle headlamp according to claim 1, wherein the third rotation member rotates a diffusion filter.

7. The vehicle headlamp according to claim 1, wherein the sub-unit includes a mounting member that rotates in the lateral direction, wherein the vertically changing mechanism is mounted on said mounting member.

8. The vehicle headlamp according to claim 7, wherein the third rotation member rotates a diffusion filter.

9. The vehicle headlamp according to claim 4, wherein the optical control member is movable with respect to the projection lens and the light source.

10. The vehicle headlamp according to claim 1, wherein the optical control member is movable with respect to a projection lens and the light source.

11. The vehicle headlamp according to claim 2, wherein the optical control member is movable with respect to a projection lens and the light source.

* * * * *